United States Patent
Yu et al.

(10) Patent No.: US 11,277,877 B2
(45) Date of Patent: Mar. 15, 2022

(54) METHOD AND APPARATUS FOR AVOIDING FAILURE OF TRANSMITTING CONSECUTIVE DATA PACKETS

(71) Applicant: HUAWEI TECHNOLOGIES CO., LTD., Shenzhen (CN)

(72) Inventors: Feng Yu, Beijing (CN); Bo Lin, Beijing (CN); Guangwei Yu, Beijing (CN); Feng Gao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/874,291

(22) Filed: May 14, 2020

(65) Prior Publication Data
US 2020/0275509 A1    Aug. 27, 2020

Related U.S. Application Data

(63) Continuation of application No. PCT/CN2018/115330, filed on Nov. 14, 2018.

(30) Foreign Application Priority Data

Nov. 15, 2017 (CN) .......................... 201711133111.X

(51) Int. Cl.
*H04W 76/18* (2018.01)
*H04W 76/25* (2018.01)
(Continued)

(52) U.S. Cl.
CPC ........... *H04W 76/18* (2018.02); *H04L 1/1642* (2013.01); *H04L 1/1812* (2013.01);
(Continued)

(58) Field of Classification Search
CPC ..... H04W 76/18; H04W 76/25; H04W 76/27; H04W 28/0268; H04W 80/02;
(Continued)

(56) References Cited

U.S. PATENT DOCUMENTS 6,961,309 B2    11/2005   Carlson et al.
2013/0283285 A1   10/2013   Zhou et al.
(Continued)

FOREIGN PATENT DOCUMENTS

| CN | 1780199 A | 5/2006 |
| CN | 101098177 A | 1/2008 |

(Continued)

OTHER PUBLICATIONS

3GPP TR 22.804 V0.2.0 (Aug. 2017);3rd Generation Partnership Project;Technical Specification Group Services and System Aspects;Study on Communication for Automation in Vertical Domains;(Release 15);total 91 pages.
(Continued)

*Primary Examiner* — Afshawn M Towfighi
(74) *Attorney, Agent, or Firm* — Hauptman Ham, LLP

(57) ABSTRACT

An apparatus includes a processor, and a non-transitory computer-readable storage medium coupled to the processor, and configured to store programmable instructions. When executed by the processor the programmable instructions cause the apparatus to maintain a transmission status of a previous data packet of a first access stratum entity, and adjust a transmission parameter of a current data packet, in response to the transmission status of the previous data packet being a transmission failure.

20 Claims, 9 Drawing Sheets

(51) Int. Cl.
  *H04W 76/27* (2018.01)
  *H04L 1/16* (2006.01)
  *H04L 1/18* (2006.01)
  *H04W 28/02* (2009.01)
  *H04W 80/02* (2009.01)
  *H04W 80/08* (2009.01)

(52) U.S. Cl.
  CPC ....... *H04W 28/0268* (2013.01); *H04W 76/25* (2018.02); *H04W 76/27* (2018.02); *H04W 80/02* (2013.01); *H04W 80/08* (2013.01)

(58) Field of Classification Search
  CPC ..... H04W 80/08; H04W 28/06; H04W 76/00; H04W 76/19; H04L 1/1642; H04L 1/1812; H04L 1/0003; H04L 1/0009; H04L 1/188; H04L 1/1685; H04L 2001/0097; H04L 1/1825; H04L 1/203; H04L 5/00
  See application file for complete search history.

(56) References Cited

U.S. PATENT DOCUMENTS

| | | | |
|---|---|---|---|
| 2014/0022904 A1* | 1/2014 | Ahmad | H04W 28/0289 370/235 |
| 2018/0048572 A1* | 2/2018 | Gulati | H04W 28/0236 |
| 2019/0288770 A1* | 9/2019 | Martin | H04L 1/1832 |

FOREIGN PATENT DOCUMENTS

| | | |
|---|---|---|
| CN | 102404097 A | 4/2012 |
| CN | 104244445 A | 12/2014 |
| CN | 104486166 A | 4/2015 |
| CN | 105025524 A | 11/2015 |
| CN | 105450357 A | 3/2016 |
| CN | 106817318 A | 6/2017 |
| EP | 1505756 A2 | 2/2005 |
| WO | 2006065181 A1 | 6/2006 |
| WO | 2012155821 A1 | 11/2012 |
| WO | 2013120245 A1 | 8/2013 |

OTHER PUBLICATIONS

Extended European Search Report issued in corresponding European Patent Application No. 18879757.5, dated Nov. 20, 2020, pp. 1-8, Munich, Germany.

Chinese Office Action issued in corresponding Chinese Office Action No. 201711133111, dated Mar. 3, 3021, pp. 1-10.

* cited by examiner

METHOD AND APPARATUS FOR AVOIDING FAILURE OF TRANSMITTING CONSECUTIVE DATA PACKETS

CROSS-REFERENCE TO RELATED DISCLOSURES

This application is a continuation of International Application No. PCT/CN2018/115330, filed on Nov. 14, 2018, which claims priority to Chinese Patent Application No. 201711133111.X, filed on Nov. 15, 2017, the disclosures of the aforementioned applications are hereby incorporated by reference in their entireties.

TECHNICAL FIELD

Embodiments of this disclosure relate to the communications field, and more specifically, to a method and an apparatus for avoiding failure of transmitting consecutive data packets.

BACKGROUND

In an industrial control scenario, motion control is relatively challenging due to a relatively high requirement on communication. A motion controller is responsible for controlling and moving or rotating a part (for example, a mechanical arm) of a machine to complete a task, for example, delivering goods or assembling parts. A communication mode between the motion controller and the controlled part may be wired communication or wireless communication. An advantage of the wireless communication is that no line is deployed between the controller and the controlled part. This reduces costs, and increases support of a system for mobility, so that the controlled part can move anywhere. In addition, for some plant areas and factories, production lines are customized and reorganized based on requirements at any time. It is more convenient to reorganize a production line equipped with a wireless communications system. As a 5G communications system develops, communication performance of the wireless communication becomes better, and is sufficient to meet a low-latency and high-reliability communications requirement in the industrial control scenario. Therefore, 5G communication will be one of main communications technologies in the future industrial control field.

In the industrial control scenario, a requirement on a communications indicator is relatively high, and control signaling is transmitted with high reliability assurance in short time. In the control scenario, the controller usually transmits an instruction to the controlled unit periodically, to instruct the controlled unit how to perform an action. Because 100% reliability cannot be achieved for communication, when an application layer is designed, an error is usually allowed to occur in one instruction, but errors are not allowed to occur in two consecutive instructions. If two pieces of consecutive control signaling are lost or transmitted incorrectly, the application layer performs consecutive actions according to incorrect instructions or disconnects a connection. This may cause device damage or production line stoppage, resulting in huge property loss or personal safety accidents.

SUMMARY

Embodiments of this disclosure provide a method and an apparatus for avoiding failure of transmitting consecutive data packets, to ensure that in a data transmission process, a case in which two consecutive application layer data packets both fail to be transmitted does not occur. This improves data transmission reliability.

According to some embodiments, a method for avoiding failure of transmitting consecutive data packet is provided. The method includes:

maintaining, by a first access stratum entity of a transmit end, a transmission status of a previous data packet of the first access stratum entity; and if the transmission status of the previous data packet is transmission failure, adjusting, by the transmit end, a transmission parameter of a current data packet.

In a possible implementation, the first access stratum entity of the transmit end is one of the following: a radio link control layer; a service data adaptation protocol layer; a radio resource control layer; a media access control layer; or a physical layer.

In some embodiments, the data packet is a service data unit or a protocol data unit.

In a possible implementation, the access stratum entity of the transmit end maintains the transmission status of the previous data packet of the access stratum entity based on at least one of the following information: when a timer maintained by the first access stratum entity of the transmit end expires and the previous data packet is still not transmitted successfully, it is considered that the transmission status of the previous data packet is transmission failure; or the previous data packet is transmitted successfully before a timer maintained by the first access stratum entity of the transmit end expires, it is considered that the transmission status of the previous data packet is transmission success; indication information sent by a first access stratum entity of a receive end to an access stratum of the transmit end is used to indicate that the previous data packet of the first access stratum entity of the transmit end is transmitted successfully or fails to be transmitted; indication information sent by a second access stratum entity of the transmit end to the first access stratum entity of the transmit end is used to indicate that the previous data packet of the first access stratum entity of the transmit end is transmitted successfully or fails to be transmitted; indication information sent by a second access stratum entity of a receive end to an access stratum of the transmit end is used to indicate that the previous data packet of the first access stratum entity of the transmit end is transmitted successfully or fails to be transmitted; the first access stratum entity or a second access stratum entity of the transmit end determines, based on a sequence number of the current data packet, that the previous data packet fails to be transmitted if the sequence number of the received current data packet and the sequence number of the previous data packet are not consecutive; the first access stratum entity or a second access stratum entity of the transmit end learns of a period of a data packet based on QoS information, and if no data packet is received within a previous period, determines that the previous data packet fails to be transmitted; or indication information sent by a non-access stratum or an application layer of the transmit end to an access stratum of the transmit end is used to indicate that the previous data packet of the first access stratum entity of the transmit end is transmitted successfully or fails to be transmitted.

In some embodiments, the transmission parameter includes at least one of the following: a modulation and coding scheme; a maximum quantity of transmissions of a hybrid automatic repeat request HARQ; a maximum quantity of transmissions of an automatic repeat request ARQ; a period of a transmission resource; a location of a transmission resource; a size of a transmission resource; a type of a transmission resource; a priority of a logical channel; a priority of a radio bearer; a transmission mode of radio link control; a quantity of transmitted carriers; a type of a radio bearer; or a function of a radio bearer.

According to some embodiments, an embodiment of this disclosure provides an apparatus for avoiding failure of transmitting consecutive data packets, configured to perform the method according to the embodiments. Specifically, the apparatus for avoiding failure of transmitting consecutive data packets includes a unit configured to perform the method according to any one of the embodiments and the implementations of the embodiments.

According to some embodiments, a computer-readable storage medium is provided. The computer-readable storage medium stores a computer program (an instruction), and when the program (the instruction) runs on a computer, the computer is enabled to perform the method according to any one of the foregoing embodiments.

According to some embodiments, this disclosure provides a chip system. The chip system includes a processor, configured to support an apparatus for avoiding failure of transmitting consecutive data packets in implementing a function in the foregoing aspects, for example, generating or processing data and/or information in the foregoing method. In a possible design, the chip system further includes a memory. The memory is configured to store a program instruction and data that are used for the apparatus for avoiding failure of transmitting consecutive data packets. The chip system may include a chip, or may include a chip and another discrete device.

DETAILED DESCRIPTION

To make a person skilled in the art understand the solutions in the present disclosure better, the following describes several embodiments in more detail with reference to the accompanying drawings and implementations. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure. The following describes the technical solutions in embodiments of this disclosure with reference to the accompanying drawings in the embodiments of this disclosure. It should be noted that the technical solutions and features in the embodiments of this disclosure may be mutually combined in a case of no conflict.

In the embodiments of this disclosure, "a/an" means a single individual, and does not indicate that "a/an" can only be one individual and cannot be applied to another individual. For example, in the embodiments of this disclosure, "a terminal device" refers to a particular terminal device, and this does not mean that "a terminal device" can be applied only to one particular terminal device. The terms "system" and "network" may be used interchangeably in this disclosure.

A reference to "an embodiment" (or "an implementation") or "embodiments" (or "implementations") in this disclosure means that a specific feature, a structure, a feature, and the like that are described with the embodiments are included in at least one embodiment. Therefore, "in an embodiment" or "in the embodiments" that appears throughout this specification does not represent a same embodiment.

Further, in the embodiments of this disclosure, the terms "and/or" and "at least one" used in cases of "A and/or B" and "at least one of A and B" include any one of three scenarios: a scenario in which A is included but B is excluded, a scenario in which B is included but A is excluded, and a scenario in which both options A and B are included. In another example, in a case of "A, B, and/or C" and "at least one of A, B, and/or C", this phrase includes any one of six scenarios: a scenario in which A is included but both B and C are excluded, a scenario in which B is included but both A and C are excluded, a scenario in which C is included but both A and B are excluded, a scenario in which both A and B are included but C is excluded, a scenario in which both B and C are included but A is excluded, a scenario in which both A and C are included but B is excluded, and a scenario in which three options A, B, and C are included. As easily understood by a person of ordinary skill in the art and a related art, all other similar descriptions can be understood in the foregoing manner in the embodiments of this disclosure.

Figure 1:
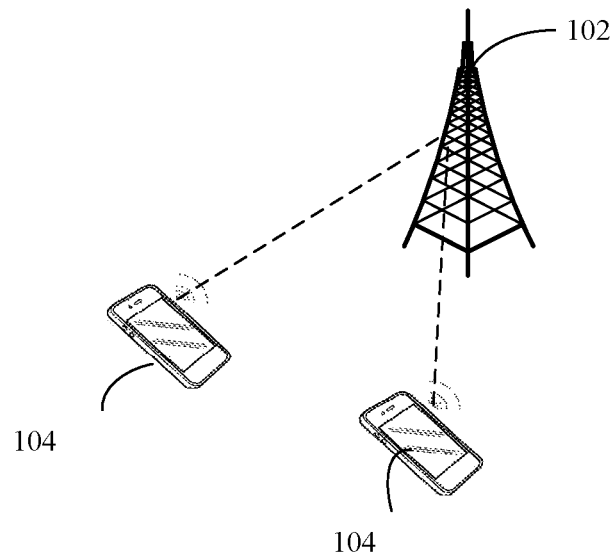
FIG. 1 is a schematic architectural diagram of a wireless communications system according to some embodiments of this disclosure.

FIG. 1 is a schematic diagram of communication between a wireless device and a wireless communications system. The wireless communications system may be a system to which various radio access technologies (RAT) are applied, for example, code division multiple access (CDMA), time division multiple access (TDMA), and frequency division multiple access (FDMA), orthogonal frequency-division multiple access (OFDMA), single carrier frequency division multiple access (SC-FDMA), and another system. For example, the wireless communications system may be a long term evolution (LTE) system, a CDMA system, a wideband code division multiple access (WCDMA) system, a global system for mobile communications (GSM) system, a wireless local area network (WLAN) system, a new radio (NR) system, various evolved or converged systems, and a system using a future communications technology. The system architecture and the service scenario described in the embodiments of this disclosure are intended to describe the technical solutions in the embodiments of this disclosure more clearly, and do not constitute a limitation on the technical solutions provided in the embodiments of this disclosure. A person of ordinary skill in the art may know that, with evolution of a network architecture and emergence of a new service scenario, the technical solutions provided in the embodiments of this disclosure are also applicable to similar technical problems.

For brevity, FIG. 1 shows communication between one network device 102 (for example, an access network device) and two wireless devices 104 (for example, terminal devices). Generally, the wireless communications system may include any quantities of network devices and terminal devices. The wireless communications system may further include one or more core network devices, a device configured to bear a virtualized network function, or the like. The access network device 102 may provide a service for the wireless device by using one or more carriers. In this disclosure, the access network device and the terminal device are further collectively referred to as wireless apparatuses.

In this disclosure, the access network device 102 is an apparatus that is deployed in a radio access network to provide a wireless communication function for a terminal device. The access network device may include a macro base station (BS), a micro base station (also referred to as a small cell), a relay node, an access point, or the like in various forms. In systems that use different radio access technologies, names of a device having a radio access function may be different. For example, in an LTE system, the device is referred to as an evolved NodeB (eNB or eNodeB); in a 3rd generation (3G) system, the device is referred to as a NodeB (Node B), and the like. For ease of description, in this disclosure, the device is briefly referred to as an access network device, and is sometimes referred to as a base station.

The wireless device in the embodiments of this disclosure may include various handheld devices, vehicle-mounted devices, wearable devices, or computing devices that have a wireless communication function, or another processing device connected to a wireless modem. The wireless device may be referred to as a terminal device, or may be referred to as a mobile station (MS), a terminal, user equipment (UE), or the like. The wireless device may be a subscriber unit, a cellular phone, a smartphone, a wireless data card, a personal digital assistant (PDA) computer, a tablet computer, a modem or a modem processor, a handheld device, a laptop computer, a netbook, a cordless phone, or a wireless local loop (WLL) station, a Bluetooth device, a machine type communication (MTC) terminal, and the like. For ease of description, the wireless device is briefly referred to as a terminal device or UE in this disclosure.

The wireless device may support one or more wireless technologies used for wireless communication, for example, 5G, LTE, WCDMA, CDMA, lx, time division-synchronous code division multiple access (TS-SCDMA), GSM, 802.11, and the like. The wireless device may also support a carrier aggregation technology.

A plurality of wireless devices may perform a same service or different services, for example, a mobile broadband service, an enhanced mobile broadband (eMBB) service, and an ultra-reliable low-latency communication (URLLC) service.

Figure 2:
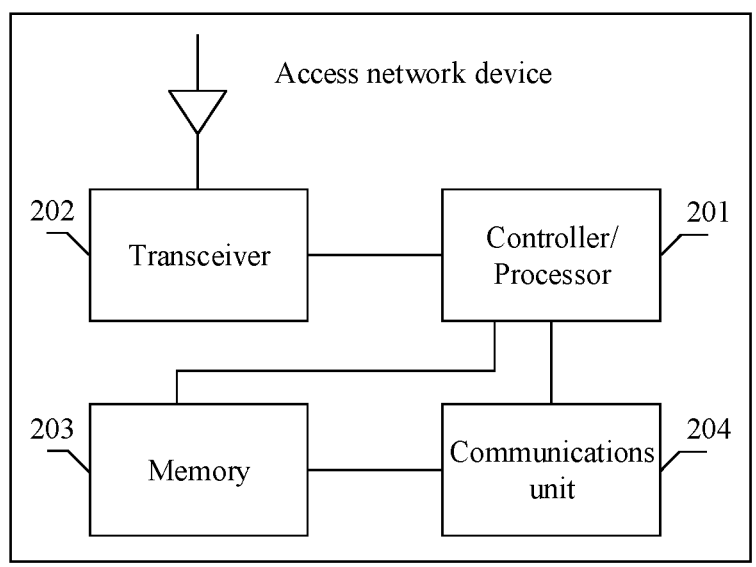
FIG. 2 is a structural diagram of a terminal device according to some embodiments of this disclosure.

Further, a possible schematic structural diagram of the access network device 102 may be shown in FIG. 2. The access network device 102 can perform a method provided in the embodiments of this disclosure. The access network device 102 may include a controller or a processor 201 (the processor 201 is used as an example below for description) and a transceiver 202. The controller/processor 201 is sometimes also referred to as a modem processor. The modem processor 201 may include a baseband processor (BBP) (not shown). The baseband processor processes a received digitalized signal, to extract information or a data bit transmitted in the signal. Therefore, based on a requirement or an expectation, the BBP is usually implemented in one or more digital signal processors (DSP) in the modem processor 201 or implemented as a separated integrated circuit (IC).

The transceiver 202 may be configured to: support information receiving and sending between the access network device 102 and the terminal devices, and support radio communication between the terminal devices. The processor 201 may be further configured to perform various functions for communication between the terminal devices and another network device. On an uplink, an uplink signal from the terminal device is received by using an antenna, demodulated by the transceiver 202, and further processed by the processor 201, to restore service data and/or signaling information sent by the terminal device. On a downlink, service data and/or a signaling message are/is processed by the terminal device, modulated by the transceiver 202 to generate a downlink signal, and transmitted to UE by using an antenna. The access network device 102 may further include a memory 203, which may be configured to store program code and/or data of the access network device 102. The transceiver 202 may include an independent receiver circuit and an independent transmitter circuit, or maybe a circuit implementing receiving and sending functions. The access network device 102 may further include a communications unit 204, configured to support communication between the access network device 102 and another network entity. For example, the communications unit 204 is configured to support communication between the access network device 102 and a network device of a core network.

In some embodiments, the access network device may further include a bus. The transceiver 202, the memory 203, and the communications unit 204 may be connected to the processor 201 by using the bus. For example, the bus may be a peripheral component interconnect (PCI) bus, an extended industry standard architecture (EISA) bus, or the like. The bus may include an address bus, a data bus, a control bus, and the like.

Figure 3:
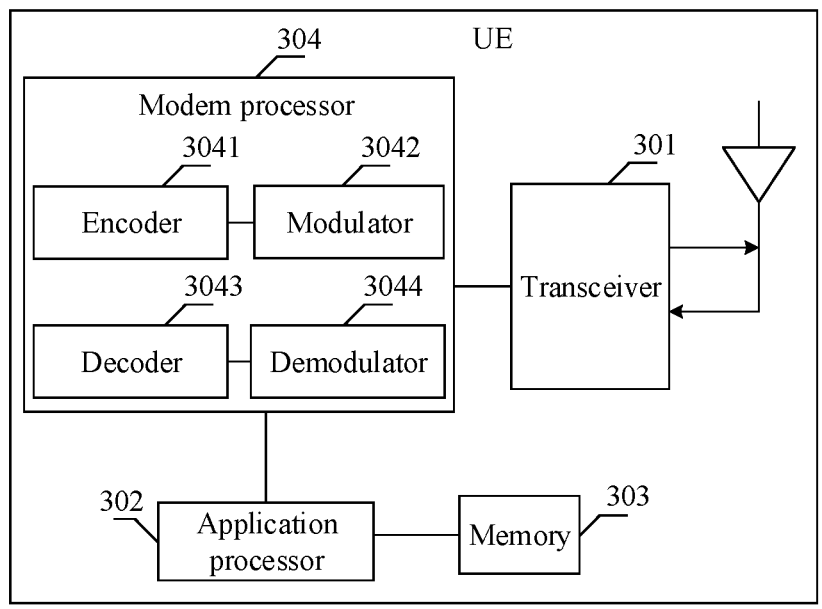
FIG. 3 is a structural diagram of an access network device according to some embodiments of this disclosure.

FIG. 3 is a possible schematic structural diagram of a terminal device in the foregoing wireless communications system. The terminal device can perform a method provided in the embodiments of this disclosure. The terminal device may be either of the two terminal devices 104. The terminal device includes a transceiver 301, an application processor (application processor) 302, a memory 303, and a modem processor (modem processor) 304.

The transceiver 301 may adjust (for example, perform analog conversion, filtering, amplification, and up-conversion on) an output sample and generate an uplink signal. The uplink signal is transmitted to the base station in the foregoing embodiment by using an antenna. On a downlink, the antenna receives a downlink signal transmitted by an access network device. The transceiver 301 may adjust (for example, perform filtering, amplification, down-conversion, and digitalization on) a signal received from the antenna and provide an input sample.

The modem processor 304 is sometimes also referred to as a controller or a processor, and may include a baseband processor (BBP) (not shown). The baseband processor processes a received digitalized signal, to extract information or a data bit transmitted in the signal. Based on a requirement or an expectation, the BBP is usually implemented in one or more digits in the modem processor 304 or implemented as a separated integrated circuit (IC).

In a design, the modem processor 304 may include an encoder 3041, a modulator 3042, a decoder 3043, and a demodulator 3044. The encoder 3041 is configured to encode a to-be-sent signal. For example, the encoder 3041 may be configured to: receive service data and/or a signaling message that are/is to be sent on an uplink, and perform processing (for example, formatting, encoding, or interleaving) on the service data and the signaling message. The modulator 3042 is configured to modulate an output signal of the encoder 3041. For example, the modulator may perform processing such as symbol mapping and/or modulation on the output signal (data and/or signaling) of the encoder, and provide an output sample. The demodulator 3044 is configured to demodulate an input signal. For example, the demodulator 3044 processes an input sample and provides symbol estimation. The decoder 3043 is configured to decode a demodulated input signal. For example, the decoder 3043 performs processing such as de-interleaving and/or decoding on the demodulated input signal, and outputs a decoded signal (data and/or signaling). The encoder 3041, the modulator 3042, the demodulator 3044, and the decoder 3043 may be implemented by the integrated modem processor 304. These units perform processing based on a radio access technology used in a radio access network.

The modem processor 304 receives, from the application processor 302, digitalized data that may represent voice, data, or control information, and processes the digitalized data for transmission. The modem processor may support one or more of a plurality of wireless communication protocols of a plurality of communications systems, for example, LTE, new radio, a universal mobile telecommunications system (UMTS), and high speed packet access (HSPA). In some embodiments, the modem processor 304 may also include one or more memories.

In some embodiments, the modem processor 304 and the application processor 302 may be integrated in one processor chip. The memory 303 is configured to store program code (sometimes also referred to as a program, an instruction, software, or the like) and/or data that are/is used to support communication of the terminal device.

It should be noted that, the memory 203 or the memory 303 may include one or more storage units, for example, may be a storage unit that is in the processor 201 or the modem processor 304 or the application processor 302 and that is used to store program code, or may be an external storage unit independent of the processor 201 or the modem processor 304 or the application processor 302, or may be a component including a storage unit that is in the processor 201 or the modem processor 304 or the application processor 302 and an external storage unit that is independent of the processor 201 or the modem processor 304 or the application processor 302.

The processor 201 and the modem processor 304 may be processors of a same type, or may be processors of different types. For example, the processor 201 and modem processor 304 each may be implemented as a central processing unit (CPU), a general-purpose processor, a digital signal processor (DSP), an application-specific integrated circuit (ASIC), a field programmable gate array (FPGA) or another programmable logic device, a transistor logic device, a hardware component, another integrated circuit, or any combination thereof. The processor 201 and the modem processor 304 may implement or execute various examples of logic blocks, modules, and circuits described with reference to content disclosed in the embodiments of this disclosure. The processor may alternatively be a combination that implements a computing function device, for example, a combination including one or more microprocessors, a combination of a DSP and a microprocessor, or a system-on-a-chip (SOC).

A person skilled in the art can understand that various explanatory logic blocks, modules, circuits, and algorithms described with reference to the various aspects disclosed in this disclosure may be implemented as electronic hardware, an instruction that is stored in a memory or another computer-readable medium and that is executed by a processor or another processing device, or a combination thereof. As an example, the devices described in this specification may be applied to any circuit, hardware component, IC, or IC chip. The memory disclosed in this disclosure may be any type of memory in any size, and may be configured to store any type of information. To clearly explain such interchangeability, various explanatory components, blocks, modules, circuits, and steps have been generally described above based on functionality. How to implement such functionality depends on a specific application, a design selection, and/or a design constraint that is imposed on an entire system. A person skilled in the art may use different manners to implement the described functions for each particular application, but it should not be considered that such implementation goes beyond the scope of this disclosure.

In a design process of an existing communications technology including a 5G technology, transmission reliability of consecutive application layer data packets is not specially considered. In some approaches, transmission reliability assurance is usually designed for only one data packet, and transmission reliability of the data packet is ensured to some extent by using a retransmission mechanism. In the embodiments of this disclosure, for a feature that an application layer does not allow errors of two consecutive data packets, a method for dynamically adjusting transmission reliability of a data packet based on a transmission status of a previous data packet is provided. The following describes in more details the solutions provided in the embodiments of this disclosure with reference to the accompanying drawings.

Figure 4:
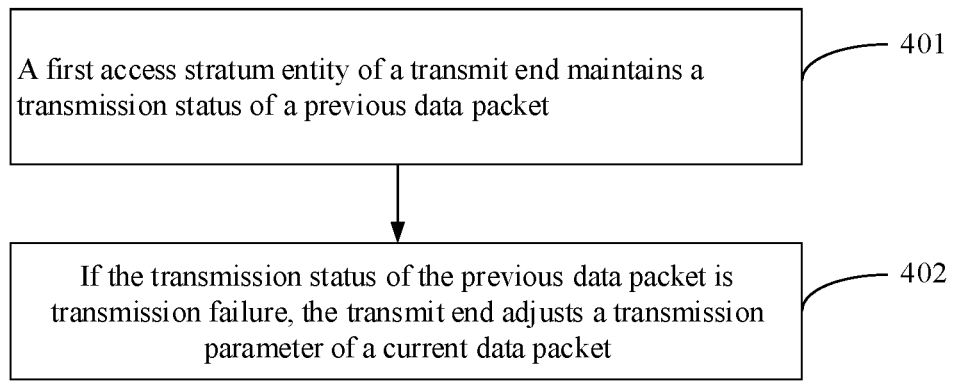
FIG. 4 is a schematic flowchart of a method for avoiding failure of transmitting consecutive data packets according to some embodiments of this disclosure.

FIG. 4 is a schematic flowchart of a method for avoiding failure of transmitting consecutive data packets according to an embodiment of this disclosure. The method may be applied to the network architecture shown in FIG. 1, and the terminal device and the access network device that are shown in FIG. 2 and FIG. 3. It should be noted that a transmit end in this embodiment of this disclosure may be a terminal device or an access network device. When the transmit end is a terminal device, a receive end may be an access network device. When the transmit end is an access network device, the receive end may be a terminal device. However, this disclosure is not limited thereto.

Step 401: A first access stratum entity of the transmit end maintains a transmission status of a previous data packet of the first access stratum entity.

The data packet herein may be a service data unit (SDU) or a protocol data unit (PDU) of the first access stratum entity.

In some embodiments, the data packet is an application layer data packet, and is used, at a communications layer, as an initial service data unit (SDU) of the communications layer. The transmission status includes "transmission success" or "transmission failure".

In some embodiments, the first access stratum entity of the transmit end may be at least one of the following: a service data adaptation protocol (SDAP) layer, a packet data convergence protocol (PDCP) layer, a radio link control (RLC) layer, a media access control (MAC) layer, a radio resource control (RRC) layer, or a physical (PHY) layer.

Figure 5:
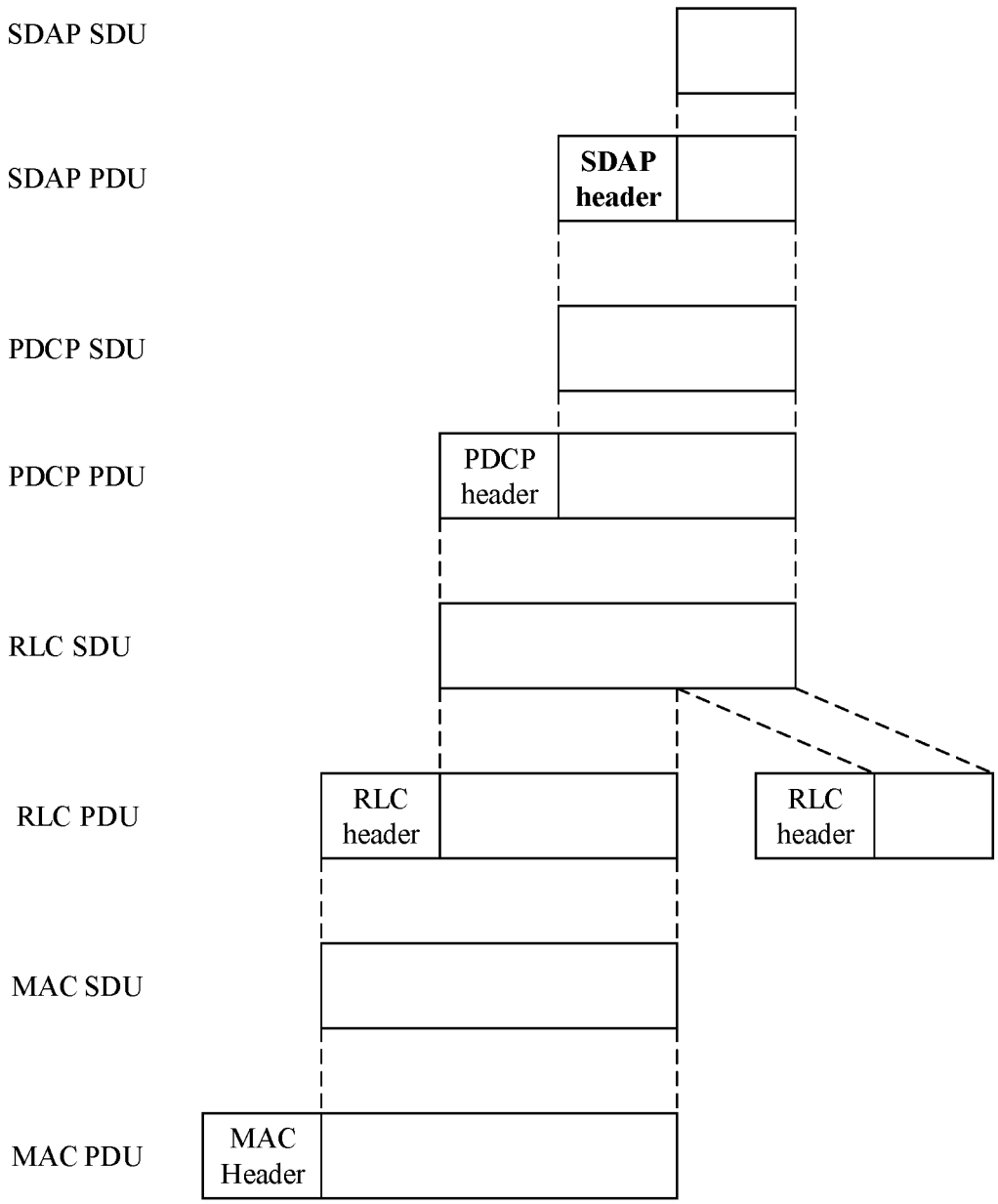
FIG. 5 is a schematic diagram of transmission of a data packet according to some embodiments of this disclosure.

FIG. 5 is used as an example. For example, the application layer data packet is transmitted as an SDAP SDU, and is encapsulated into an SDAP PDU after an SDAP header is added to the SDAP SDU, and the SDAP PDU is delivered to the PDCP layer. The SDAP PDU received at the PDCP layer is transmitted as a PDCP SDU, and is encapsulated into a PDCP protocol data unit (PDU) after a PDCP header is added to the PDCP SDU, and the PDCP PDU is delivered to a lower layer, RLC layer. The PDCP PDU received at the RLC layer is an RLC SDU. The RLC SDU is encapsulated into an RLC PDU after an RLC header is added to the RLC SDU. The RLC layer has a segmentation function. Therefore, one RLC SDU may be segmented into a plurality of RLC PDUs for transmission. RLC PDUs of a plurality of logical channels are multiplexed at the MAC layer, to form a MAC PDU. Each RLC PDU is considered as a MAC SDU at the MAC layer.

In some embodiments, the access stratum entity of the transmit end maintains the transmission status of the previous data packet of the access stratum entity based on at least one of the following information:

when a timer maintained by the first access stratum entity of the transmit end expires and the previous data packet is still not transmitted successfully, it is considered that the transmission status of the previous data packet is transmission failure; or the previous data packet is transmitted successfully before a timer maintained by the first access stratum entity of the transmit end expires, it is considered that the transmission status of the previous data packet is transmission success;

indication information sent by a first access stratum entity of a receive end to an access stratum of the transmit end is used to indicate that the previous data packet of the first access stratum entity of the transmit end is transmitted successfully or fails to be transmitted;

indication information sent by a second access stratum entity of the transmit end to the first access stratum entity of the transmit end is used to indicate that the previous data packet of the first access stratum entity of the transmit end is transmitted successfully or fails to be transmitted;

indication information sent by a second access stratum entity of a receive end to an access stratum of the transmit end is used to indicate that the previous data packet of the first access stratum entity of the transmit end is transmitted successfully or fails to be transmitted;

the first access stratum entity or a second access stratum entity of the transmit end determines, based on a sequence number of the current data packet, that the previous data packet fails to be transmitted if the sequence number of the received current data packet and the sequence number of the previous data packet are not consecutive;

the first access stratum entity or a second access stratum entity of the transmit end learns of a period of a data packet based on QoS information, and if no data packet is received within a previous period, determines that the previous data packet fails to be transmitted; or indication information sent by a non-access stratum or an application layer of the transmit end to an access stratum of the transmit end is used to indicate that the previous data packet of the first access stratum entity of the transmit end is transmitted successfully or fails to be transmitted.

It should be noted that the first access stratum entity and the second access stratum entity in this embodiment of this disclosure may be a non-access stratum entity or another protocol layer entity. This is not limited in this disclosure.

Step 402: If the transmission status of the previous data packet is transmission failure, the transmit end adjusts a transmission parameter of a current data packet. The transmission parameter may be a radio resource configuration parameter.

In some embodiments, the transmission parameter includes at least one of the following: a modulation and coding scheme (MCS); a maximum quantity of transmissions of a hybrid automatic repeat request (HARQ); a maximum quantity of transmissions of an automatic repeat request (ARQ); a period of a transmission resource; a location of a transmission resource; a size of a transmission resource; a type of a transmission resource; a priority of a logical channel; a priority of a radio bearer; a transmission mode (an RLC AM or UM or TM) of radio link control; a quantity of transmitted carriers; a type of a radio bearer; a function of a radio bearer (for example, use of repeat transmission or not, or use of single connectivity, dual connectivity, or multi-connectivity); or transmit power.

An MCS modulation and coding table is a representation form proposed in 802.11n to represent a communication rate. The MCS uses a factor that affects the communication rate as a column of the table, and uses an MCS index as a row to form a rate table. Therefore, each MCS index corresponds to a physical transmission rate under a group of parameters.

The maximum quantity of transmissions of the hybrid automatic repeat request indicates a maximum quantity of transmissions of a same MAC PDU at the MAC layer.

The maximum quantity of transmissions of the automatic repeat request indicates a maximum quantity of transmissions of a same RLC PDU at the RLC layer.

The period of the transmission resource may include, for example, a period of an semi-persistent scheduling (SPS) resource, namely, an interval between two neighboring SPS resources in time domain. For example, an original SPS period is 2, and an SPS period of a subsequent data packet is 1.

The location of the transmission resource may include, for example, a start location and an end location of the SPS resource in the time domain, and a start location and an end location of the SPS resource in frequency domain. Specifically, a frequency domain location may be a carrier index, a subcarrier index, or a bandwidth part (BWP) index, and a time domain location may be a symbol index, a slot number, a subframe number, a frame number, a superframe number, or the like.

The size of the transmission resource may include a size of the SPS resource, a quantity of time domain units occupied in the time domain, or a quantity of frequency domain units occupied in time domain. Specifically, the time domain unit may be a symbol, a slot, a subframe, a frame, a superframe, or the like. The frequency domain unit may be a carrier, a subcarrier, a BWP, or the like.

The type of the transmission resource may include, for example, an SPS resource, a grant-free resource, or a dynamic scheduling resource.

The priority of the logical channel is used to indicate a priority of each logical channel when the logical channel is multiplexed at the MAC layer. Different logical channels may have a same priority.

The radio link control layer, the RLC layer, has three transmission modes: an RLC AM, an RLC UM, and an RLC TM.

RLC acknowledged mode (AM): A reliable transmission service is provided through error detection and retransmission. This mode provides all RLC functions.

RLC unacknowledged mode (UM): This mode provides all RLC functions except retransmission and re-segmentation. Therefore, this mode provides an unreliable transmission service.

RLC transparent mode (TM): In this mode, the RLC can be considered as null. No processing is performed on the RLC SDU, and no RLC header is added. This is because only a data passthrough function is provided in this mode.

The type of the radio bearer includes a data radio bearer (DRB) and a signaling radio bearer (SRB). Further, the type of the radio bearer may further include different DRB IDs and different SRB IDs.

The transmit power is transmit power used by the transmit end to transmit a MAC PDU.

Figure 6:
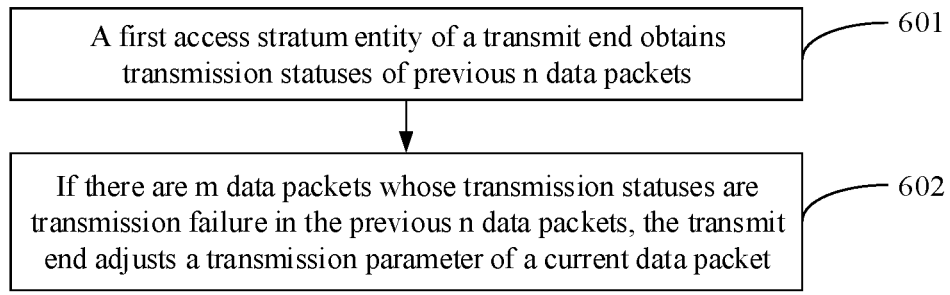
FIG. 6 is a schematic flowchart of a method for avoiding failure of transmitting consecutive data packets according to some embodiments of this disclosure.

FIG. 6 is a schematic flowchart of a method for avoiding failure of transmitting consecutive data packets according to an embodiment of this disclosure. The method may be applied to the network architecture shown in FIG. 1, and the terminal device and the access network device that are shown in FIG. 2 and FIG. 3. It should be noted that a transmit end in this embodiment of this disclosure may be a terminal device or an access network device. When the transmit end is a terminal device, a receive end may be an access network device. When the transmit end is an access network device, the receive end may be a terminal device. However, this disclosure is not limited thereto.

Step 601: A first access stratum entity of the transmit end obtains transmission statuses of previous n data packets of the first access stratum entity.

The data packet herein may be a service data unit (SDU) or a protocol data unit (PDU) of the first access stratum entity. The data packet may be specifically a data packet from an application layer, and is used, at a communications layer, as an initial service data unit (SDU) of the communications layer. The transmission status includes transmission success or transmission failure.

In some embodiments, the first access stratum entity of the transmit end may be at least one of the following: a service data adaptation protocol (SDAP) layer, a packet data convergence protocol (PDCP) layer, a radio link control (RLC) layer, a media access control (MAC) layer, a radio resource control (RRC) layer, or a physical (PHY) layer.

Step 602: If there are m data packets whose transmission statuses are transmission failure in the previous n data packets, the transmit end adjusts a transmission parameter of a current data packet.

The transmission parameter in step 602 is the same as the transmission parameter in step 402, and details are not described herein again.

It should be noted that, after obtaining the transmission statuses of the previous n data packets of the first access stratum entity, the first access stratum entity of the transmit end determines whether there are m data packets whose transmission statuses are transmission failure in the previous n data packets, where n is a positive integer, and m is a positive integer less than or equal to n. The m data packets may be consecutive data packets, or may be inconsecutive data packets. When the m data packets are consecutive data packets, 2. If the transmit end determines that there are m data packets whose transmission statuses are transmission failure in the previous n data packets, the transmit end adjusts the transmission parameter of the current data packet (an $(n+1)^{th}$ data packet).

In some embodiments, the access stratum entity of the transmit end obtains the transmission statuses of the previous n data packets of the access stratum entity based on at least one of the following:

(1) The first access stratum entity of the transmit end maintains a plurality of counters (for example, a first counter and a second counter). The first counter is used to collect statistics on the n data packets of the first access stratum entity, and the second counter is configured to collect statistics on an accumulated quantity of data packets that fail to be transmitted in the n data packets. In an implementation of this disclosure, initial values of the first counter and the second counter are both 0. A threshold is set for the second counter. The threshold may be configured by a core network device or the access network device, or the threshold may be obtained from an application layer or a non-access stratum of the terminal device. The first access stratum entity of the transmit end obtains the transmission status of each data packet. An obtaining method is the same as the method for obtaining the transmission status of the previous data packet in step 401, and is not described herein again. The value of the first counter is increased by 1 each time a data packet of the first access stratum entity is obtained. When a transmission status of a data packet obtained by the first access stratums entity of the transmit end is transmission failure, the value of the second counter is increased by 1. When the value of the second counter is greater than or equal to the threshold, for example, the threshold is set to m, it is considered that there are m data packets whose transmission statuses are transmission failure in the previous n data packets of the first access stratum entity of the transmit end, and the transmit end adjusts the transmission parameter of the current data packet. When the value of the first counter is equal to n, and the value of the second counter is less than the threshold m, the transmit end still maintains the transmission parameter of the current data packet.

(2) Indication information sent by a first access stratum entity of a receive end to an access stratum of the transmit end is used to indicate whether there are m data packets that fail to be transmitted in the previous n data packets of the first access stratum entity of the transmit end.

(3) Indication information sent by a second access stratum entity of the transmit end to the first access stratum entity of the transmit end is used to indicate whether there are m data packets that fail to be transmitted in the previous n data packets of the first access stratum entity of the transmit end.

(4) Indication information sent by a second access stratum entity of a receive end to an access stratum of the transmit end is used to indicate whether there are m data packets that fail to be transmitted in the previous n data packets of the first access stratum entity of the transmit end.

(5) The first access stratum entity of a second access stratum entity of the transmit end may receive indication information of a first access stratum entity of a receive end or indication information of a second access stratum entity of the transmit end. The indication information includes sequence numbers of currently transmitted data packets and a transmission status of a data packet corresponding to each sequence number. The first access stratum entity of the transmit end maintains a counter, and the counter is configured to collect statistics on an accumulated quantity of data packets that fail to be transmitted. An initial value of the counter is 0. If the sequence number of the current received data packet and the sequence number of a previous data packet are not consecutive, the value of the counter is increased by 1. In an embodiment of this disclosure, a threshold of the counter is set to m. When the value of the counter is greater than or equal to the threshold m, it is considered that there are m data packets whose transmission statuses are transmission failure in the previous n data packets of the access stratum entity of the transmit end.

(6) Indication information sent by a non-access stratum or an application layer of the transmit end to an access stratum of the transmit end is used to indicate whether there are m data packets that fail to be transmitted in the previous n data packets of the first access stratum entity of the transmit end.

It should be noted that the first access stratum entity and the second access stratum entity in this embodiment of this disclosure may be a non-access stratum entity or another protocol layer entity. This is not limited in this disclosure.

In some embodiments, when the transmit end is a terminal device, n may be configured by an access network device or a core network device; or n may be obtained from an application layer or a non-access stratum of the terminal device.

In an embodiment of this disclosure, when the transmit end is the terminal device, n may be obtained through calculation based on a survival time (survival time) T of the application layer and a cycle time (cycle time or transfer time) t of an application layer service (service). For example, n=T/t. If T cannot be exactly divided by t, a result may be rounded up or down. T and t are configured by the access network device or the core network device, or are obtained from the application layer or the non-access stratum of the terminal device. In this case, m may be configured by the access network device or the core network device, or may be obtained from the application layer or the non-access stratum of the terminal device.

In some embodiments, when the transmit end is an access network device, n may be configured by a core network device or reported by a terminal device.

In another embodiment of this disclosure, when the transmit end is the access network device, n may also be obtained through calculation based on a survival time T of an application layer and a cycle time t of an application layer service. For example, n=T/t. Similarly, if T cannot be exactly divided by t, a result may be rounded up or down. T and t are configured by the core network device or reported by the terminal device. In this case, m may be configured by the core network device or reported by the terminal device.

In another embodiment of this disclosure, m may also be obtained through calculation based on a survival time T of an application layer and a cycle time t of an application layer service. For example, m=T/t. Similarly, if T cannot be exactly divided by t, a result may be rounded up or down. T and t are configured by a core network device or reported by a terminal device. In this case, n may be configured by the core network device or configured by an access network device, or reported by the terminal device, or obtained from an application layer or a non-access stratum of the terminal device.

It should be noted that the embodiments of this disclosure are not limited to the embodiment described in FIG. 6. For example, according to the method provided in the embodiments of this disclosure, the first access stratum entity of the transmit end may obtain a transmission status of each data packet of the first access stratum entity. Within preset time, when there are s data packets whose transmission statuses are transmission failure in the obtained data packets of the first access stratum entity, the transmit end adjusts the transmission parameter of the current data packet. s is a positive integer.

For another example, according to the method provided in the embodiments of this disclosure, the first access stratum entity of the transmit end may obtain transmission statuses of at least k data packets that are of the first access stratum entity and that are counted backward. When there are k consecutive data packets whose transmission statuses are transmission failure in the obtained data packets of the first access stratum entity, the transmit end adjusts the transmission parameter of the current data packet. k is a positive integer, and k≥2.

In some embodiments, k may be 2, 3, or 4. In other words, when there are 2, 3, or 4 consecutive data packets whose transmission statuses are transmission failure in the obtained data packets of the first access stratum entity, the transmit end adjusts the transmission parameter of the current data packet. To be specific, when k=2, the transmit end adjusts the transmission parameter of the current third data packet; when k=3, the transmit end adjusts the transmission parameter of the current fourth data packet; when k=4, the transmit end adjusts the transmission parameter of the current fifth data packet.

For another example, according to the method provided in the embodiments of this disclosure, the first access stratum entity of the transmit end obtains transmission statuses of at least previous x data packets of the access stratum entity. When the obtained transmission statuses of the previous x data packets are transmission failure, the transmit end adjusts the transmission parameter of the current data packet. x is a positive integer, and x≥2.

In some embodiments, x may be 2, 3, or 4. In other words, when the obtained transmission statuses of the previous two, three, or four data packets of the first access stratum entity are transmission failure, the transmit end adjusts the transmission parameter of the current data packet. To be specific, when x=2, when transmitting a data packet whose sequence number is PDCP PDU #i, the first access stratum entity of the transmit end determines transmission statuses of two previous data packets, namely, data packets whose sequence numbers are PDCP PDU #(i-1) and PDCP PDU #(i-2). If the transmission statuses of the data packets with the two sequence numbers are both transmission failure, the transmit end adjusts a transmission parameter of the data packet with the PDCP PDU #i. Cases for x=3 or x=4 is similar to the case for x=2, and details are not described herein again.

Figure 7:
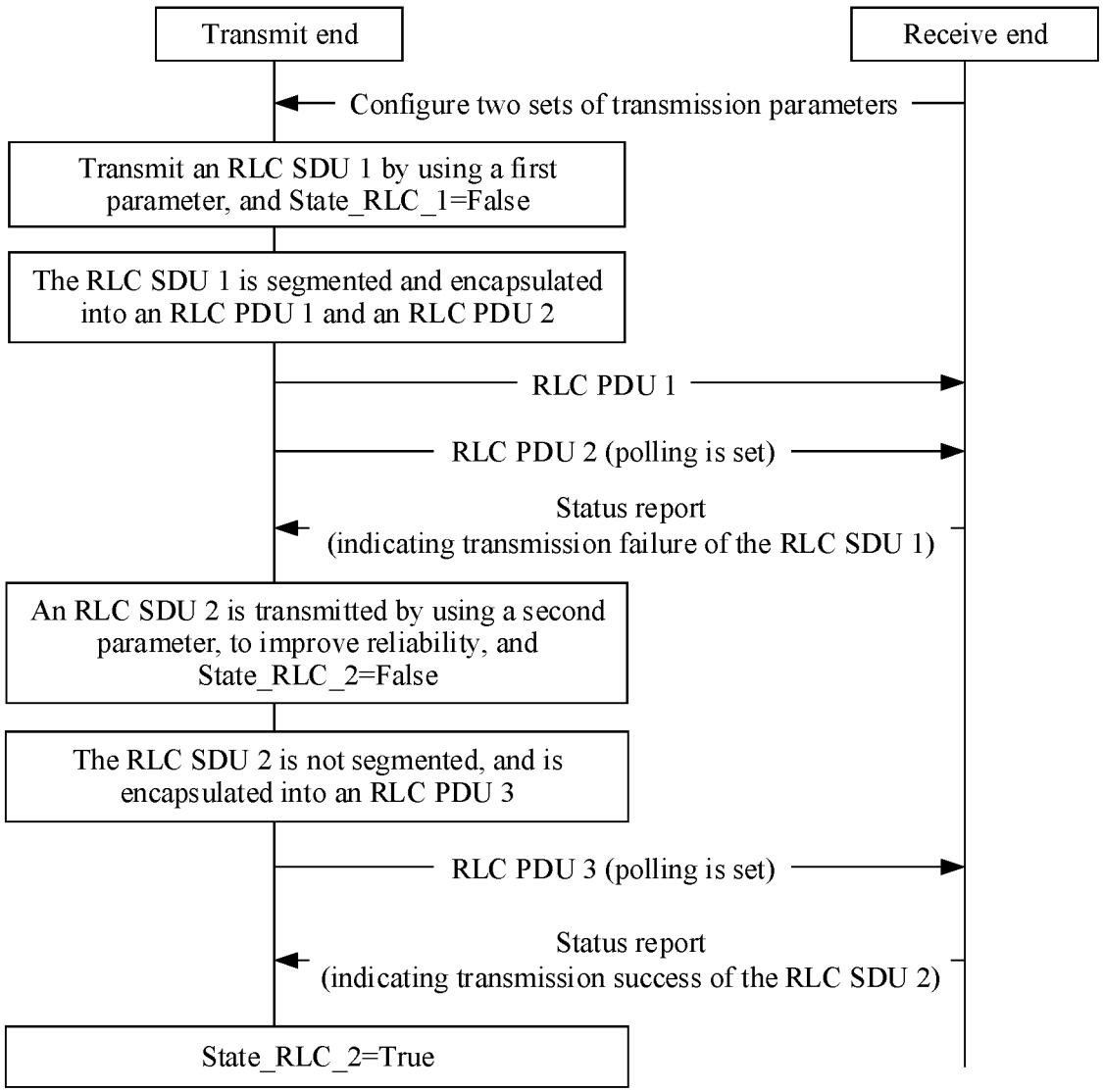
FIG. 7 is a schematic flowchart of adjustment performed based on an RLC SDU transmission status error fed back by an RLC layer of a receive end according to some embodiments of this disclosure.

Maintenance of a Transmission Status and Adjustment of a Transmission Parameter Based on an RLC SDU Fed Back by the RLC Layer of a Receive End FIG. 7 is a schematic flowchart of adjustment performed based on an RLC SDU transmission status error fed back by the RLC layer of a receive end according to an embodiment of this disclosure. The following uses an example in which the receive end is an access network device, and includes the following steps (but this disclosure is not limited thereto).

Step S701: In some embodiments, in a process of establishing a radio bearer, the access network device determines, based on quality of service (QoS) information corresponding to the bearer, whether there is a requirement for transmission reliability of consecutive data packets. If there is a requirement for transmission reliability of consecutive data packets, two sets of resource parameters are configured. The two sets of resource parameters are different at least in content of a RadioResourceConfigDedicated information element. The resource parameter may be specifically a maximum quantity of transmissions of a HARQ, a maximum quantity of transmissions of an ARQ, an MCS, or the like. However, this disclosure is not limited thereto. The QoS information may be obtained from a core network, or may be obtained from a terminal device. In the following steps, State_RLC_1 is a variable used by a transmit end to maintain a transmission status of a previous data packet, and State_RLC_2 is a variable used by the transmit end to maintain a transmission status of a current data packet.

Step S702: An RLC entity of the terminal device receives an RLC SDU 1 from an upper layer (for example, a PDCP layer), and sets a transmission status variable State_RLC_1 corresponding to the RLC SDU 1 to False.

Step S703: It is assumed that the RLC SDU 1 is segmented for transmission due to limited scheduling resources at a bottom layer, and is encapsulated into an RLC PDU 1 and an RLC PDU 2. A polling field in an RLC header of the RLC PDU 2 is set.

Step S704: It is assumed that the RLC PDU 1 fails to be transmitted, and the RLC PDU 2 is transmitted successfully. When an RLC entity of the access network device receives the RLC PDU 2, because the polling field is set, the RLC entity of the access network device generates a status report, including information about whether each RLC PDU (including at least the RLC PDU 1 and the RLC PDU 2) is successfully received.

Step S705: The terminal device receives the status report sent by the access network device, learns of transmission failure of the RLC PDU 1, determines that the RLC SDU 1 fails to be transmitted, and maintains State_RLC_1 as False.

In some embodiments, the RLC layer indicates, to another protocol layer such as an RRC layer, a MAC layer, a PHY layer, or a PDCP layer, that the transmission status of the RLC SDU 1 is failure. After receiving the indication, each protocol layer sets a transmission parameter corresponding to the protocol layer to a second resource parameter.

Step S706: The RLC entity of the terminal device receives the RLC SDU 2. Because State_RLC_1 is False, the second resource parameter is used to transmit the RLC SDU 2. The initial transmission status variable State_RLC_2 corresponding to the RLC SDU 2 is set to False.

Step S707: It is assumed that the RLC SDU 2 is not segmented at the RLC layer, the RLC SDU 2 is directly encapsulated into an RLC PDU 3, and the RLC PDU 3 is delivered to the bottom layer for transmission, where the polling field is set.

Step S708: It is assumed the RLC PDU 3 is transmitted successfully, when receiving the RLC PDU 3, the RLC entity of the access network device generates a status report because the polling field is set, where the status report includes information about whether each RLC PDU (including at least the RLC PDU 3) is successfully received.

Step S709: The terminal device receives the status report sent by the access network device, learns that the RLC PDU 3 is transmitted successfully, determines that the RLC SDU 2 is transmitted successfully, and sets State_RLC_2 to True.

In some embodiments, the RLC layer indicates, to another protocol layer such as the RRC layer, the MAC layer, the PHY layer, or the PDCP layer, that the transmission status of the RLC SDU 2 is success. After receiving the indication, each protocol layer sets a transmission parameter corresponding to the protocol layer to a first resource parameter.

Figure 8:
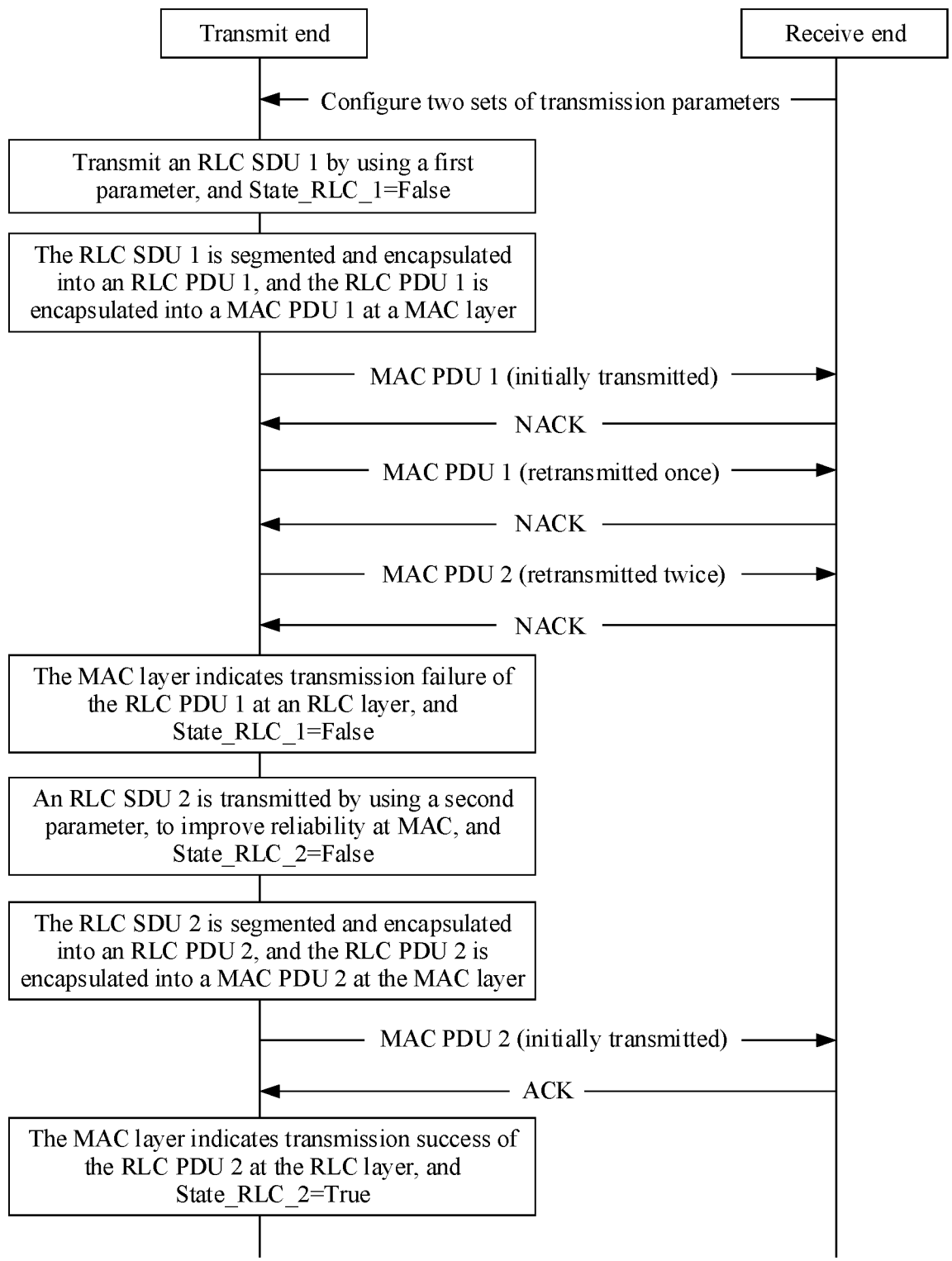
FIG. 8 is a schematic flowchart of adjustment performed based on an RLC SDU transmission status error fed back by a MAC layer of a receive end according to some embodiments of this disclosure.

Maintenance of a Transmission Status and Adjustment of a Transmission Parameter Based on an RLC SDU Fed Back by a MAC Layer of a Receive End FIG. 8 is a schematic flowchart of adjustment performed based on an RLC SDU transmission status error fed back by the MAC layer of the receive end according to an embodiment of this disclosure. The following uses an example in which the receive end is an access network device, and includes the following steps (but this disclosure is not limited thereto).

Step 801 and step 802 are the same as step 701 and step 702 in FIG. 7, and details are not described herein again.

Step 803: It is assumed that the RLC SDU 1 is not segmented, the RLC SDU 1 is encapsulated into an RLC PDU 1. The RLC PDU 1 is delivered to the MAC layer for transmission. The RLC PDU 1 is encapsulated into a MAC PDU 1 at the MAC layer.

Step 804: It is assumed that the MAC PDU 1 fails to be transmitted for x consecutive times, where x is a positive integer, the MAC layer indicates the information to an RLC entity where the RLC PDU 1 is located. The RLC entity determines that the RLC SDU 1 fails to be transmitted, and maintains State_RLC_1 as False.

In some embodiments, x may be a maximum quantity of transmissions of a HARQ. The MAC layer indicates transmission failure of the RLC PDU 1 to an RLC layer after the maximum quantity of transmissions of the HARQ of the MAC PDU 1 is reached.

In some embodiments, the RLC layer indicate, to another protocol layer such as an RRC layer, a MAC layer, a PHY layer, or a PDCP layer, that the transmission status of the RLC SDU 1 is failure. After receiving the indication, each protocol layer sets a transmission parameter corresponding to the protocol layer to a second resource parameter.

Step 805: The RLC entity of the terminal device receives an RLC SDU 2 from an upper layer, and sets a transmission status variable State_RLC_2 corresponding to the RLC SDU 2 to False.

Step 806: It is assumed that the RLC SDU 2 is not segmented, the RLC SDU 2 is encapsulated into an RLC PDU 2. The RLC PDU 2 is delivered to the MAC layer for transmission. The RLC PDU 2 is encapsulated into a MAC PDU 2 at the MAC layer.

Step 807: It is assumed that the MAC PDU 2 is transmitted successfully, the MAC layer indicates the information to an RLC entity in which the RLC PDU 2 is located, and the RLC entity determines that the RLC SDU 2 is transmitted successfully, and maintains State_RLC_2 as True.

In some embodiments, the RLC layer indicates, to another protocol layer such as the RRC layer, the MAC layer, the PHY layer, or the PDCP layer, that the transmission status of the RLC SDU 2 is success. After receiving the indication, each protocol layer sets a transmission parameter corresponding to the protocol layer to a first resource parameter.

In some embodiments, in addition to the foregoing method for indicating a transmission status of an RLC SDU, another indication method is further included. An example is as follows.

Each RLC entity of a transmit end (where a terminal device is used as an example for uplink) maintains a transmission status of each RLC SDU in the entity. For example, the RLC entity maintains a variable State_RLC_SN for an RLC SDU whose RLC layer sequence number is an SN.

In some embodiments, in Embodiment 1 and Embodiment 2, a condition for setting the variable State_RLC_SN to False includes at least one of the following:

(1) The variable State_RLC_SN is initially set to False. For example, the RLC SDU corresponding to the SN is obtained from the PDCP layer, or the first RLC PDU corresponding to the RLC SDU is delivered to the MAC layer.

(2) Statuses received from a peer RLC entity indicate that at least one of all RLC PDUs corresponding to the RLC SDU fails to be received.

In some embodiments, the RLC entity of the transmit end sets the polling field based on a quantity (for example, 1) of sent RLC SDUs, that is, sets the polling field when sending a last RLC PDU corresponding to each RLC SDU, and the RLC entity of the receive end generates a status report each time receiving an RLC SDU.

(3) The MAC layer indicates that at least one of one or more MAC PDUs in which all RLC PDUs corresponding to the RLC SDU are located is not transmitted successfully in n consecutive HARQ transmissions, where n is a positive integer and is configured by using RRC signaling of the access network device. In some embodiments, n may be equal to a maximum quantity of transmissions of a HARQ.

(4) The PDCP layer indicates that the RLC SDU or a PDCP SDU/PDU corresponding to the RLC SDU is not transmitted successfully.

(5) The RLC layer does not receive, within a time range specified by a timer, a status report including transmission success of the RLC SDU corresponding to the SN.

(6) That a value of State_RLC_SN is False is obtained directly from signaling (RLC control PDU, RRC signaling, MAC CE, or DCI) of a layer of the receive end. When failing to decode, at the RLC layer, an RLC SDU corresponding to an SN (for example, because a reordering timer expires or content of the SDU cannot be identified), the terminal device generates signaling including that the value of State_RLC_SN is False. The signaling may be RRC signaling, a MAC control element (CE), an RLC control PDU, or downlink control information (DCI).

In some embodiments, in Embodiment 1 and Embodiment 2, a condition for setting the variable State_RLC_SN to True includes at least one of the following:

(1) A status report fed back by a peer RLC entity indicates that RLC PDUs corresponding to the RLC SDU are all successfully received. In some embodiments, the RLC entity of the transmit end sets the polling field based on a quantity (for example, 1) of sent RLC SDUs, that is, sets the polling field when sending a last RLC PDU corresponding to each RLC SDU.

(2) The MAC layer indicates that MAC PDUs in which RLC PDUs corresponding to the RLC SDU are located are all transmitted successfully, and the MAC layer feeds back, to an RLC entity corresponding to each logical channel, a transmission status of each RLC PDU of the RLC entity.

(3) The PDCP layer indicates that the RLC SDU or a PDCP SDU/PDU corresponding to the RLC SDU is transmitted successful.

(4) That a value of State_RLC_SN is True is obtained directly from signaling (PDCP control PDCU, RLC control PDU, MAC CE, DCI, or RRC signaling) of a layer of the receive end.

When successfully decoding an RLC SDU corresponding to an SN at the RLC layer, the receive end generates signaling including that the value of State_RLC_SN is True. The signaling may be RRC signaling, a MAC CE, an RLC control PDU, or DCI.

In some embodiments, the RLC entity indicates a transmission status of each RLC SDU to another layer, for example, the RRC layer, the SDAP layer, the PDCP layer, the MAC layer, or the PHY layer.

When the value of State_RLC_SN is False, if an RLC SDU whose sequence number is an SN+1 is sent, the transmit end performs transmission by using the second resource parameter. This includes the following steps:

(1) The PDCP layer or the RLC layer activates duplication of a bearer or a logical channel on which the RLC SDU with the SN+1 is located.

(2) The RLC SDU with the SN+1 is transmitted based on a pre-configured parameter (for example, a quantity of transmission time interval bundling (TTI bundling), a modulation and coding scheme, a maximum quantity of transmissions of a hybrid automatic repeat request HARQ, a maximum quantity of transmissions of an automatic repeat request ARQ, a period of a transmission resource, a location of a transmission resource, a size of a transmission resource, a type of a transmission resource, a priority of a logical channel, a priority of a radio bearer, a transmission mode of radio link control, a quantity of transmitted carriers, a type of a radio bearer, a function of a radio bearer, or the like). The parameter is configured by using RRC signaling and activated when the RLC SDU whose sequence number is the SN fails to be transmitted.

Figure 9:
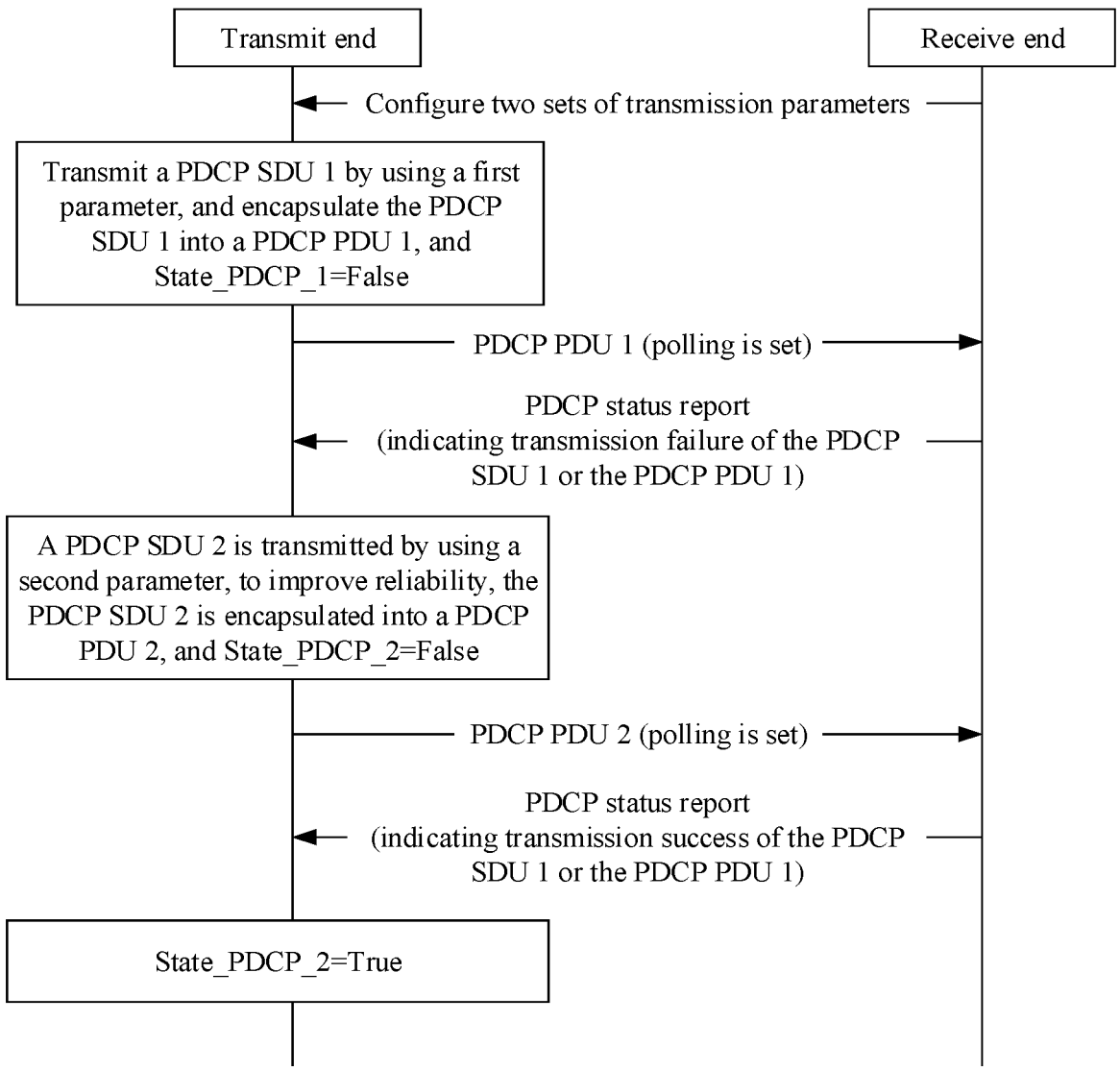
FIG. 9 is a schematic flowchart of adjustment performed based on a PDCP SDU transmission status error fed back by a PDCP layer of a receive end according to some embodiments of this disclosure.

Similar to FIG. 7, FIG. 9 is a schematic flowchart of adjustment performed based on a PDCP SDU transmission status error fed back by a PDCP layer of a receive end according to an embodiment of this disclosure. Each PDCP entity of a transmit end (where a terminal device is used as an example for uplink) maintains a transmission status of each PDCP SDU/PDU in the entity. For example, the PDCP entity maintains a variable State_PDCP_SN for a PDCP SDU/PDU whose PDCP layer sequence number is an SN.

In some embodiments, a condition for setting the variable State_PDCP_SN to False includes at least one of the following:

(1) The variable State_PDCP_SN is initially set to False. For example, a PDCP SDU is obtained from an upper layer (an SDAP layer, an IP layer, or an application layer), or a PDCP PDU (whose sequence number is the SN) corresponding to the PDCP SDU is delivered to an RLC layer.

(2) A status report received from a peer PDCP entity indicates the PDCP SDU/PDU fails to be transmitted. A PDCP entity of the transmit end sets a polling field in a header of each PDCP PDU, and the PDCP entity of the receive end generates a status report each time receiving a PDCP PDU.

(3) The RLC layer indicates transmission failure of a current PDCP PDU at the PDCP layer.

(4) A discardTimer of the PDCP layer for the PDCP SDU expires.

(5) That a value of State_PDCP_SN is False is obtained directly from signaling (PDCP control PDU, RRC signaling, MAC CE, or DCI) of a layer of a peer end.

(6) A non-access stratum (NAS), an application layer, or an IP layer provides an indication.

In some embodiments, a condition for setting the variable State_PDCP_SN to True includes at least one of the following:

(1) A status report fed back by a PDCP entity of the receive end indicates that the PDCP SDU/PDU is transmitted successfully.

(2) The RLC layer indicates that the PDCP SDU/PDU is transmitted successfully.

(3) That a value of State_PDCP_SN is True is obtained directly from signaling (PDCP control PDU, MAC CE, DCI, or RRC signaling) of a layer of the peer end. When successfully decoding a PDCP SDU corresponding to an SN at the PDCP layer, the receive end generates signaling including that the value of State_PDCP_SN is True. The signaling may be RRC signaling, a MAC CE, a PDCP control PDU, or DCI.

(4) A NAS layer, an application layer, or an IP layer provides indication information.

In some embodiments, the PDCP entity indicates a transmission status of each PDCP SDU/PDU to another layer, for example, the RRC layer, the SDAP layer, the RLC layer, the MAC layer, or the PHY layer.

Similarly, when the value of State_PDCP_SN is False, if a PDCP SDU whose sequence number is an SN+1 is sent, the transmit end performs transmission by using the second resource parameter. This includes the following steps:

(1) The PDCP layer or the RLC layer activates duplication (duplication) of bearers or logical channels on which the PDCP SDU with the SN+1 is located.

(2) The PDCP SDU with the SN+1 is transmitted based on a pre-configured parameter (which may include: a quantity of TTI bundling, a modulation and coding scheme, a maximum quantity of transmissions of a hybrid automatic repeat request HARQ, a maximum quantity of transmissions of an automatic repeat request ARQ, a period of a transmission resource, a location of a transmission resource, a size of a transmission resource, a type of a transmission resource, a priority of a logical channel, a priority of a radio bearer, a transmission mode of radio link control, a quantity of transmitted carriers, a type of a radio bearer, a function of a radio bearer, or the like). The parameter is configured by using RRC signaling and activated when the PDCP SDU whose sequence number is the SN fails to be transmitted.

Figure 10:
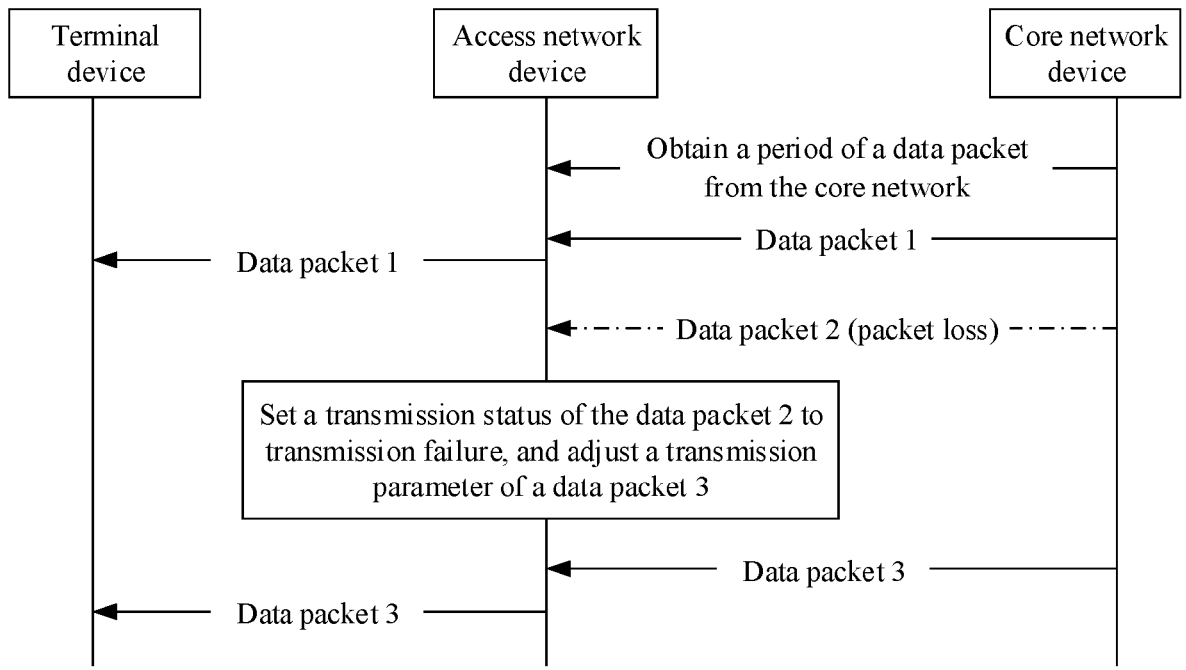
FIG. 10 is a schematic flowchart of another method for avoiding failure of transmitting consecutive data packets according to some embodiments of this disclosure.

FIG. 10 is a schematic flowchart of another method for avoiding failure of transmitting consecutive data packets according to an embodiment of this disclosure. That a transmit end is an access network device is used as an example. The method specifically includes the following steps.

Step 1001: The access network device obtains a period of a data packet from a core network device. The access network device should receive a data packet in each period.

Step 1002: The access network device receives a data packet 1 in a period 1, and transmits the data packet 1 based on a transmission parameter 1 (a first resource parameter). It is assumed that the data packet 1 is transmitted successfully on an air interface.

Step 1003: The access network device sends the data packet 1 to a terminal device.

Step 1004: The core network device sends a data packet 2 to the access network device, but the access network device does not receive the data packet 2 in a period 2. In this case, the data packet 2 of the access network device fails to be transmitted (that is, the data packet 2 is lost).

Step 1005: The access network device sets a transmission status of the data packet 2 to transmission failure, and adjusts a transmission parameter of a data packet 3 to a transmission parameter 2 (a second resource parameter).

Step 1006: The access network device receives, in a period 3, the data packet 3 sent by the core network device.

Step 1007: The access network device sends the data packet 3 to the terminal device.

Figure 11:
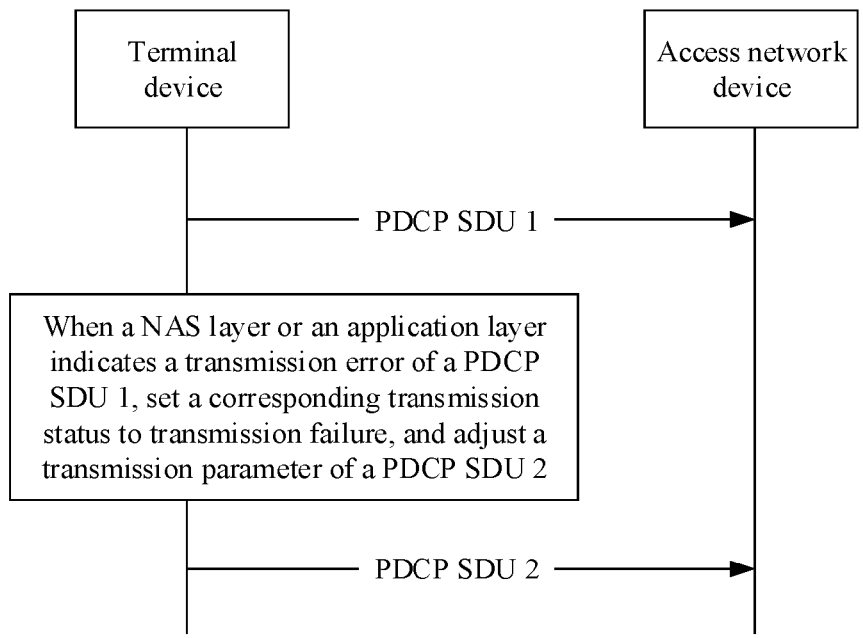
FIG. 11 is a schematic flowchart of another method for avoiding failure of transmitting consecutive data packets according to some embodiments of this disclosure.

FIG. 11 is a schematic flowchart of another method for avoiding failure of transmitting consecutive data packets according to an embodiment of this disclosure. That a transmit end is a terminal device is used as an example. The method specifically includes the following steps.

Step 1101: A PDCP layer of the terminal device sends a PDCP SDU 1 to an access network device.

Step 1102: The terminal device obtains, from a NAS layer or an application layer, an indication that the PDCP SDU 1 is transmitted incorrectly, and the terminal device sets a transmission status corresponding to the PDCP SDU 1 to transmission error. The terminal device adjusts a transmission parameter of a PDCP SDU 2 to a transmission parameter 2 (a second resource parameter), to transmit the PDCP SDU 2.

Step 1103: The terminal device transmits the PDCP SDU 2 to the access network device by using the transmission parameter 2.

Figure 12:
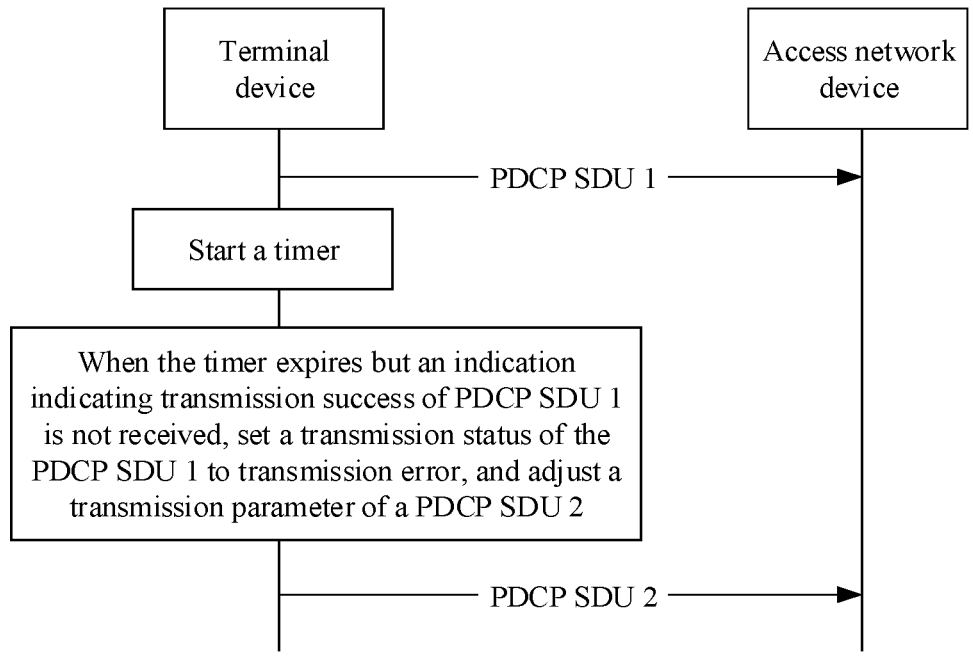
FIG. 12 is a schematic flowchart of another method for avoiding failure of transmitting consecutive data packets according to some embodiments of this disclosure.

FIG. 12 is a schematic flowchart of another method for avoiding failure of transmitting consecutive data packets according to an embodiment of this disclosure. That a transmit end is a terminal device is used as an example. The method specifically includes the following steps.

Step 1201: A PDCP layer of the terminal device sends a PDCP SDU 1 to an access network device, and simultaneously starts a timer.

Step 1202: The terminal device does not obtain indication information of transmission success of the PDCP SDU 1 before the timer expires. The terminal device sets a transmission status corresponding to the PDCP SDU 1 to transmission error, and adjusts a transmission parameter of a PDCP SDU 2 to a transmission parameter 2 (a second resource parameter), to transmit the PDCP SDU 2.

Step 1203: The terminal device transmits the PDCP SDU 2 to the access network device by using the transmission parameter 2.

Figure 13:
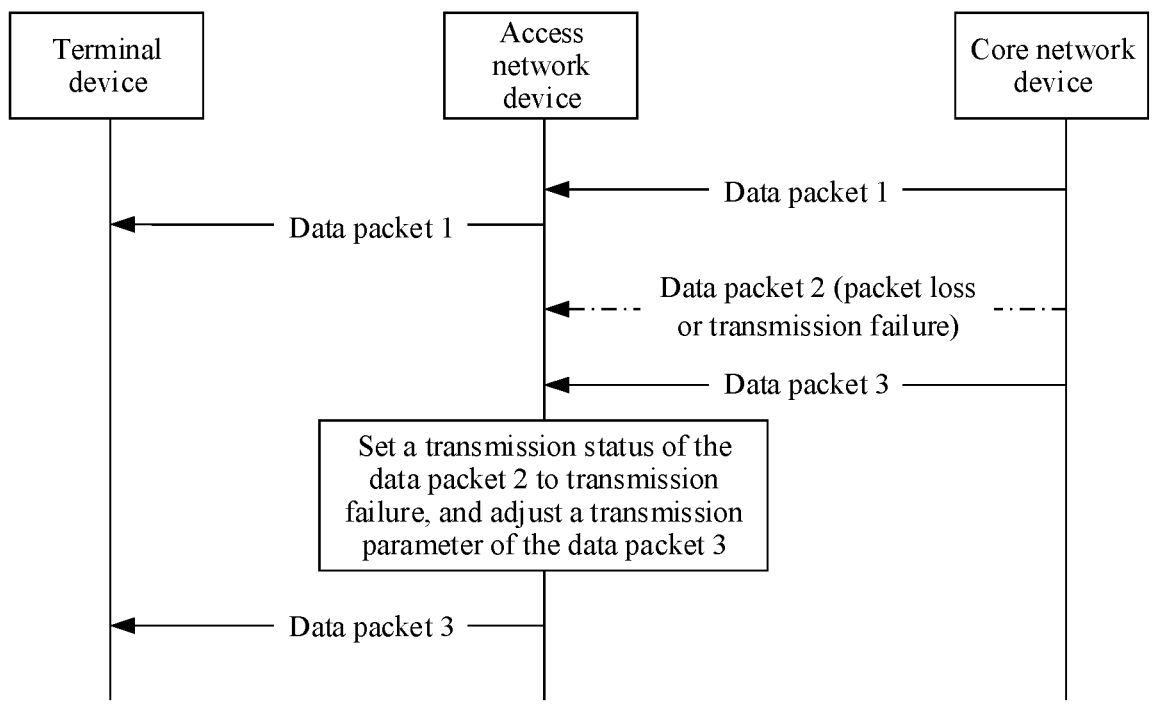
FIG. 13 is a schematic flowchart of another method for avoiding failure of transmitting consecutive data packets according to some embodiments of this disclosure.

FIG. 13 is a schematic flowchart of another method for avoiding failure of transmitting consecutive data packets according to an embodiment of this disclosure. That a transmit end is an access network device is used as an example. The method specifically includes the following steps.

Step 1301: The access network device successfully receives a data packet 1 sent by a core network device.

Step 1302: The access network device sends the data packet 1 to a terminal device.

Step 1303: The access network device successfully receives a data packet 3 sent by the core network device. The access network device finds that a data packet 2 is missing, indicating that the data packet 2 is lost or fails to be transmitted.

Step 1304. The access network device sets a transmission status of the data packet 2 to transmission failure, and adjusts a transmission parameter of the data packet 3 to a transmission parameter 2 (a second resource parameter).

Step 1305: The access network device sends the data packet 3 to the terminal device based on the transmission parameter 2.

Figure 14:
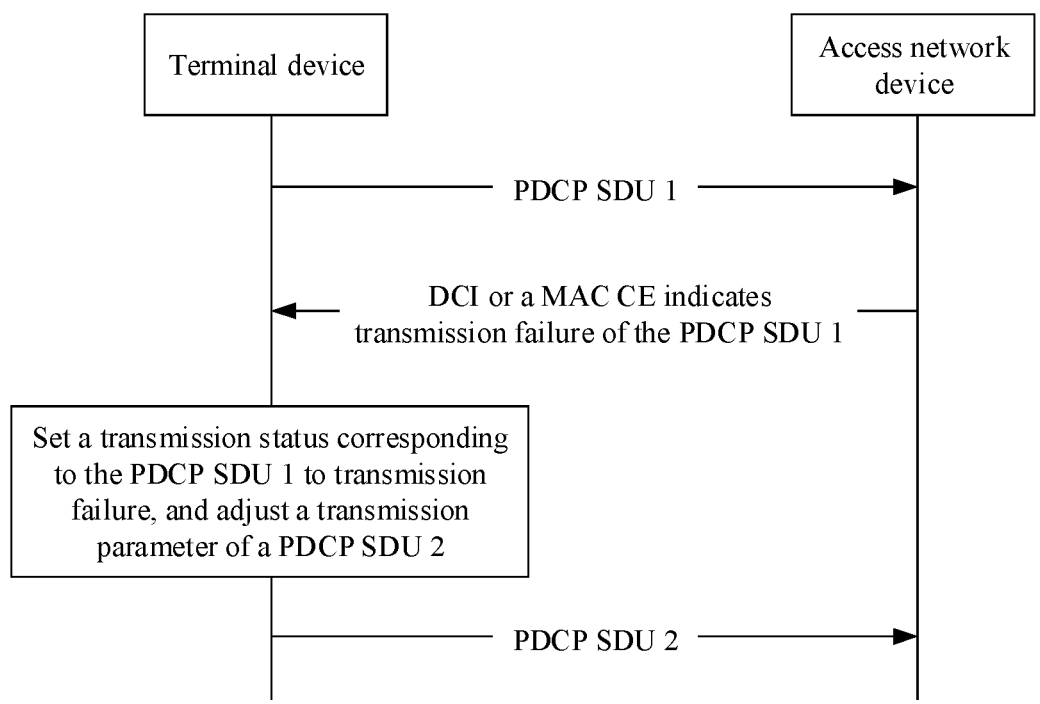
FIG. 14 is a schematic flowchart of another method for avoiding failure of transmitting consecutive data packets according to some embodiments of this disclosure.

FIG. 14 is a schematic flowchart of another method for avoiding failure of transmitting consecutive data packets according to an embodiment of this disclosure. That a transmit end is a terminal device is used as an example. The method specifically includes the following steps.

Step 1401: A PDCP layer of the terminal device sends a PDCP SDU 1 to an access network device.

Step 1402: The access network device notifies, by using DCI or a MAC CE, the terminal device that a transmission status of the PDCP SDU 1 is transmission failure. Alternatively, the access network device instructs the terminal device to transmit a next PDCP SDU, namely, a PDCP SDU 2, by using a second resource parameter (not shown in the figure).

Step 1403: The terminal device sets the transmission status corresponding to the PDCP SDU 1 to transmission failure, and adjusts a transmission parameter of the PDCP SDU 2 to a transmission parameter 2 (the second resource parameter), to transmit the PDCP SDU 2.

Step 1404: The terminal device transmits the PDCP SDU 2 to the access network device by using the transmission parameter 2.

It should be noted that all entities in the embodiments of this disclosure may be replaced with other entities, and the SDU may be a PDU. This is not limited in this disclosure. In the method provided in the embodiments of this disclosure, the transmission parameter of the current data packet is adjusted based on that the transmission status of the previous data packet is transmission error. When the transmission status of the previous data packet is a correct transmission, the transmit end does not adjust the transmission parameter of the current data packet.

According to the method in the embodiments of this disclosure, a transmission policy of a next data packet can be quickly adjusted based on a transmission status of a previous data packet, and higher reliability is used to ensure transmission of the next data packet when the previous data packet fails to be transmitted. This avoids failure of transmitting two consecutive data packets.

An example of this disclosure further provides an apparatus (for example, an integrated circuit, a wireless device, or a circuit module), configured to implement the foregoing method. The apparatus for avoiding failure of transmitting consecutive data packets described in this specification may be an independent device or may be a part of a larger device. The device may be: (i) an independent IC, (ii) a set of one or more ICs, where the set may include a memory IC configured to store data and/or an instruction, (iii) an RFIC such as an RF receiver or an RF transmitter/receiver, (iv) an ASIC such as a mobile station modem, (v) a module that can be embedded in another device, (vi) a receiver, a cellular phone, a wireless device, a hand-held phone, or a mobile unit, or (vii) others.

The method and apparatus that are provided in the embodiments of this disclosure may be applied to the terminal device or the access network device (which may be collectively referred to as a wireless device). The terminal device, the access network device, or the wireless device may include a hardware layer, an operating system layer running on the hardware layer, and an application layer running on the operating system layer. The hardware layer includes hardware such as a central processing unit (CPU), a memory management unit (MMU), and an internal memory (also referred to as a main memory). The operating system may be any one or more types of computer operating systems, for example, a Linux operating system, a Unix operating system, an Android operating system, an iOS operating system, and a Windows operating system, that implement service processing by using a process. The application layer includes applications such as a browser, an address book, word processing software, and instant messaging software. In addition, in the embodiments of this disclosure, a specific structure of an execution body of the method is not limited in the embodiments of this disclosure, provided that a program that records code of the method in the embodiments of this disclosure can be run to perform communication according to the signal transmission method in the embodiment of this disclosure. For example, the method for avoiding failure of transmitting consecutive data packets in the embodiments of this disclosure may be performed by a terminal device or an access network device, or may be performed by a function module that can invoke a program and execute the program in the terminal device or the access network device.

A person of ordinary skill in the art may be aware that, in combination with the units and algorithm steps in the examples described in the embodiments disclosed in this specification, this disclosure may be implemented by electronic hardware or a combination of electronic hardware and computer software. Whether the functions are performed by hardware or software depends on particular applications and design constraint conditions of the technical solutions. A person skilled in the art may use different methods to implement the described functions for each particular application, but it should not be considered that the implementation goes beyond the scope of the embodiments of this disclosure.

In addition, aspects or features of the embodiments of this disclosure may be implemented as a method, an apparatus or a product that uses standard programming and/or engineering technologies. The term "product" used in this disclosure covers a computer program that can be accessed from any computer-readable component, carrier, or medium. For example, the computer-readable medium may include but is not limited to: a magnetic storage component (for example, a hard disk, a floppy disk, or a magnetic tape), an optical disc (for example, a compact disc (CD), a digital versatile disc (DVD), a smart card, and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel and other various media that can store, contain, and/or carry an instruction and/or data.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer program instructions. When the computer program instruction is loaded and executed on a computer, the procedure or functions according to the embodiments of the present application are all or partially generated. The computer may be a general-purpose computer, a dedicated computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

It should be understood that sequence numbers of the foregoing processes do not mean execution sequences in various embodiments of this disclosure. The execution sequences of the processes should be determined based on functions and internal logic of the processes, and should not be construed as any limitation on the implementation processes of the embodiments of this disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this disclosure, it should be understood that the disclosed system, apparatus, and method may be implemented in other manners. For example, the described apparatus embodiments are merely examples. For example, division into the modules or units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

When the functions are implemented in the form of a software function unit and sold or used as an independent product, the functions may be stored in a computer-readable storage medium. Based on such an understanding, the technical solutions of this disclosure essentially, or the part contributing to some approaches, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of this disclosure. The foregoing storage medium includes any medium that can store program code, for example, a USB flash drive, a removable hard disk, a read-only memory (ROM), a random access memory (RAM), a magnetic disk, or an optical disc.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of the embodiments of this disclosure.

What is claimed is:

1. An apparatus, comprising:
   a processor; and
   a non-transitory computer-readable storage medium coupled to the processor, and configured to store programmable instructions, in response to execution by the processor, the programmable instructions cause the apparatus to:
   maintain transmission statuses of previous n data packets of a first access stratum entity and that are counted backwards; and
   adjust a transmission parameter of a current data packet, in response to n consecutive data packets having obtained the transmission statuses that correspond to transmission failures,
   wherein n is an integer, n≥2, and a transmission status of a previous data packet corresponds to a transmission failure in response to a timer, maintained by the first access stratum entity of the apparatus, expiring and the previous data packet not being transmitted successfully.

2. The apparatus according to claim 1, wherein the first access stratum entity includes at least:
   a radio link control layer;
   a service data adaptation protocol layer;
   a radio resource control layer;
   a media access control layer, or
   a physical layer.

3. The apparatus according to claim 1, wherein the current data packet is a service data unit or a protocol data unit.

4. The apparatus according to claim 1, wherein the programmable instructions that cause the apparatus to maintain the transmission status of the previous data packet of the first access stratum entity is further based on
   the transmission status of the previous data packet corresponding to a transmission success in response to the previous data packet being transmitted successfully before the timer, maintained by the first access stratum entity expires.

5. The apparatus according to claim 1, wherein the programmable instructions that cause the apparatus to maintain the transmission status of the previous data packet of the first access stratum entity is based on:
   indication information from the first access stratum entity of a receive end to an access stratum entity of the apparatus indicates that the previous data packet of the first access stratum entity of the apparatus is transmitted successfully or fails to be transmitted.

6. The apparatus according to claim 1, wherein the programmable instructions that cause the apparatus to maintain the transmission status of the previous data packet of the first access stratum entity is based on:
   indication information from a second access stratum entity of the apparatus to the first access stratum entity of the apparatus indicates that the previous data packet of the first access stratum entity of the apparatus is transmitted successfully or fails to be transmitted.

7. The apparatus according to claim 1, wherein the programmable instructions that cause the apparatus to maintain the transmission status of the previous data packet of the first access stratum entity is based on:
   indication information from a second access stratum entity of a receive end to the first access stratum entity of the apparatus indicates that the previous data packet of the first access stratum entity of the apparatus is transmitted successfully or fails to be transmitted.

8. The apparatus according to claim 1, wherein the programmable instructions that cause the apparatus to maintain the transmission status of the previous data packet of the first access stratum entity is based on: indication information from the first access stratum entity or a second access stratum entity of the apparatus to the first access stratum entity of the apparatus, the indication information determines, based on sequence numbers of corresponding data packets, that the previous data packet fail to be transmitted in response to a sequence number of the received current data packet and a sequence number of the previous data packet are not consecutive.

9. The apparatus according to claim 1, wherein the programmable instructions that cause the apparatus to maintain the transmission status of the previous data packet of the first access stratum entity is based on:
indication information from a second access stratum entity of the apparatus to the first access stratum entity of the transmit end, the indication information is useable to learn of a period of a data packet based on quality of service (QoS) information, and the indication information is useable to determine that the previous data packet failed to be transmitted in response to no data packet being received within a previous period.

10. The apparatus according to claim 1, wherein the programmable instructions that cause the apparatus to maintain the transmission status of the previous data packet of the first access stratum entity is based on:
indication information from a non-access stratum entity or an application layer of the apparatus to the first access stratum entity of the apparatus, the indication information indicates that the previous data packet of the first access stratum entity of the apparatus is transmitted successfully or fails to be transmitted.

11. The apparatus according to claim 1, wherein the transmission parameter includes at least:
a modulation and coding scheme;
a maximum quantity of transmissions of a hybrid automatic repeat request (HARQ);
a maximum quantity of transmissions of an automatic repeat request (ARQ);
a period of a transmission resource;
a location of the transmission resource;
a size of the transmission resource;
a type of the transmission resource;
a priority of a logical channel;
a priority of a radio bearer;
a transmission mode of radio link control;
a quantity of transmitted carriers;
a type of the radio bearer;
a function of the radio bearer; or
a transmission power.

12. An apparatus, comprising:
a processor; and
a non-transitory computer-readable storage medium coupled to the processor, and configured to store programmable instructions, when executed by the processor, the programmable instructions cause the apparatus to:
obtain transmission statuses of previous n data packets of a first access stratum entity and that are counted backwards; and
adjust a transmission parameter of a current data packet, in response to m data packets in the previous n data packets, the m data packets having obtained transmission statuses that correspond to transmission failures, wherein
m and n are positive integers, and m≤n,
wherein a transmission status of the transmission statuses of a previous data packet of the previous n data packets corresponds to a transmission failure in response to a timer, maintained by the first access stratum entity, expiring and the previous data packet of the previous n data packets not being transmitted successfully.

13. The apparatus according to claim 12, wherein the programmable instructions that cause the apparatus to obtain the transmission statuses of the previous n data packets of the first access stratum entity is based on:
m data packets in the previous n data packets have a corresponding transmission status as transmission failure in response to a quantity of data packets that fail to be transmitted is greater than or equal to m, the quantity of data packets that fail to be transmitted being counted by a counter maintained by the first access stratum entity of the apparatus.

14. The apparatus according to claim 12, wherein the programmable instructions that cause the apparatus to obtain the transmission statuses of the previous n data packets of the first access stratum entity is based on:
indication information from the first access stratum entity of a receive end to an access stratum entity of a transmit end indicates whether there are m data packets that fail to be transmitted in the previous n data packets of the first access stratum entity of the receive end.

15. The apparatus according to claim 12, wherein the programmable instructions that cause the apparatus to obtain the transmission statuses of the previous n data packets of the first access stratum entity is based on:
indication information from a second access stratum entity of the apparatus to the first access stratum entity of a transmit end indicates whether there are m data packets that fail to be transmitted in the previous n data packets of the first access stratum entity of the transmit end.

16. The apparatus according to claim 12, wherein the programmable instructions that cause the apparatus to obtain the transmission statuses of the previous n data packets of the first access stratum entity is based on: indication information from a second access stratum entity of a receive end to an access stratum entity of a transmit end indicates whether there are m data packets that fail to be transmitted in the previous n data packets of the first access stratum entity of the transmit end.

17. The apparatus according to claim 12, wherein the programmable instructions that cause the apparatus to obtain the transmission statuses of the previous n data packets of the first access stratum entity is based on:
indication information from a non-access stratum entity or an application layer of a transmit end to the first access stratum entity of the transmit end, the indication information indicates whether there are m data packets that fail to be transmitted in the previous n data packets of the first access stratum entity of the transmit end.

18. The apparatus according to claim 12, wherein
n is configured by an access network device or a core network device, or
n is obtained from an application layer or a non-access stratum entity of a terminal device.

19. An apparatus, comprising:
a processor; and
a non-transitory computer-readable storage medium coupled to the processor, and configured to store programmable instructions, in response to execution by the processor, the programmable instructions cause the apparatus to:
  obtain transmission statuses of at least k data packets that are of a first access stratum entity and that are counted backwards; and
  adjust a transmission parameter of a current data packet in response to k consecutive data packets having obtained transmission statuses that correspond to transmission failures and are part of the first access stratum entity, wherein k is a positive integer, and k≥2.

20. An apparatus, comprising:
a processor; and
a non-transitory computer-readable storage medium coupled to the processor, and configured to store programmable instructions, in response to execution by the processor, the programmable instructions cause the apparatus to:
  obtain transmission statuses of at least previous x data packets of a first access stratum entity and that are counted backwards; and
  adjust a transmission parameter of a current data packet, in response to the transmission statuses of the previous x data packets being transmission failures, wherein x is a positive integer, and x≥2,
  wherein a transmission status of the transmission statuses of a previous data packet of the previous x data packets corresponds to a transmission failure in response to a timer, maintained by the first access stratum entity, expiring and the previous data packet of the previous x data packets not being transmitted successfully.

* * * * *

UNITED STATES PATENT AND TRADEMARK OFFICE
CERTIFICATE OF CORRECTION

PATENT NO. : 11,277,877 B2
APPLICATION NO. : 16/874291
DATED : March 15, 2022
INVENTOR(S) : Feng Yu et al.

It is certified that error appears in the above-identified patent and that said Letters Patent is hereby corrected as shown below:

In the Specification

Column 12, Lines 4-18 should be replaced with:
It should be noted that, after obtaining the transmission statuses of the previous n data packets of the first access stratum entity, the first access stratum entity of the transmit end determines whether there are m data packets whose transmission statuses are transmission failure in the previous n data packets, where n is a positive integer, and m is a positive integer less than or equal to n. The m data packets may be consecutive data packets, or may be inconsecutive data packets. When the m data packets are consecutive data packets, $m \geq 2$. If the transmit end determines that there are m data packets whose transmission statuses are transmission failure in the previous n data packets, the transmit end adjusts the transmission parameter of the current data packet (an $(n+1)^{th}$ data packet).

Signed and Sealed this
Twenty-sixth Day of April, 2022

Katherine Kelly Vidal
*Director of the United States Patent and Trademark Office*